(12) United States Patent
Heyward et al.

(10) Patent No.: US 6,354,797 B1
(45) Date of Patent: Mar. 12, 2002

(54) BRAZELESS FILLET TURBINE NOZZLE

(75) Inventors: John Peter Heyward, Loveland; Gregory Alan White, Cincinnati; Richard Hartley Pugh, Maineville, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/626,980

(22) Filed: Jul. 27, 2000

(51) Int. Cl.[7] .............................. B21D 53/78; F01D 5/18
(52) U.S. Cl. ...................... 415/191; 416/97 R; 415/115; 29/889.721
(58) Field of Search .............................. 415/191, 208.2, 415/209.2, 209.3, 209.4, 210.1, 115, 116, 1; 416/95, 97 R; 29/889.721, 889.22

(56) References Cited

U.S. PATENT DOCUMENTS 3,909,157 A * 9/1975 Wachtell et al. ............ 415/217
5,382,135 A * 1/1995 Green ....................... 416/97 R

* cited by examiner

Primary Examiner—Edward K. Look
Assistant Examiner—Richard Edgar
(74) Attorney, Agent, or Firm—Andrew C. Hess; William Scott Andes

(57) ABSTRACT

A turbine nozzle includes a plurality of airfoils and integral hubs brazed into corresponding seats of outer and inner bands. The hubs have brazeless fillets blending the bands to the airfoils.

20 Claims, 4 Drawing Sheets

BRAZELESS FILLET TURBINE NOZZLE

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases which flow downstream through several turbine stages that extract energy therefrom. A high pressure turbine includes a turbine nozzle at the outlet of the combustor which channels the hot combustion gases to the high pressure or first turbine stage of rotor blades extending radially outwardly from a supporting disk.

The turbine nozzle includes hollow vanes through which air bled from the compressor is channeled for providing internal cooling of the vanes for protection against the hot combustion gases. The vanes typically include rows of film cooling holes through the airfoil surfaces thereof for discharging the cooling air in protective film cooling layers to provide additional thermal insulation against the hot combustion gases which flow thereover.

In view of the high operating temperature of the high pressure turbine nozzle, it is typically formed in arcuate segments having two vanes supported in corresponding outer and inner bands, formed in corresponding arcuate segments. The individual bands and vanes are separately cast from high strength superalloy materials for maximizing their strength at the high temperature environment of the turbine nozzle.

The four basic parts of each nozzle segment are then assembled together by inserting corresponding hubs at opposite ends of the vanes in complementary seats in the bands, and then brazing together the vanes and bands to provided a fixed, integral assembly thereof. The nozzle segments are then assembled together in a complete annular ring with suitable seals therebetween and mounted in the engine at the outlet of the combustor.

Film cooling of the nozzle vanes is used to ensure nozzle durability and corresponding long life. The nozzle bands are typically cooled from their outboard surfaces, and typically include film cooling holes extending therethrough for film cooling their inboard surfaces. The nozzle bands define the radially outer and inner flowpath boundaries for the hot combustion gases along which the gases have a relatively low velocity boundary layer, with the velocity thereof increasing to the midspan of the vanes.

This type of nozzle has been used in commercial service in this country for many years with long life exceeding about 20,000 hours of operation or about 20,000 cycles of operation. Examination of these high cycle turbine nozzles has uncovered a problem limiting additional life of the nozzles beyond these high cycles. The nozzle bands and vanes have proven to be highly durable and have sufficient integrity for further cycles of life. However, the braze joints between the vanes and bands have deteriorated and require the replacement, or significant repair, of the turbine nozzle.

Accordingly, it is desired to improve the turbine nozzle configuration for further increasing nozzle durability and life by reducing braze degradation.

BRIEF SUMMARY OF THE INVENTION

A turbine nozzle includes a plurality of airfoils and integral hubs brazed into corresponding seats of outer and inner bands. The hubs have brazeless fillets blending the bands to the airfoils.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
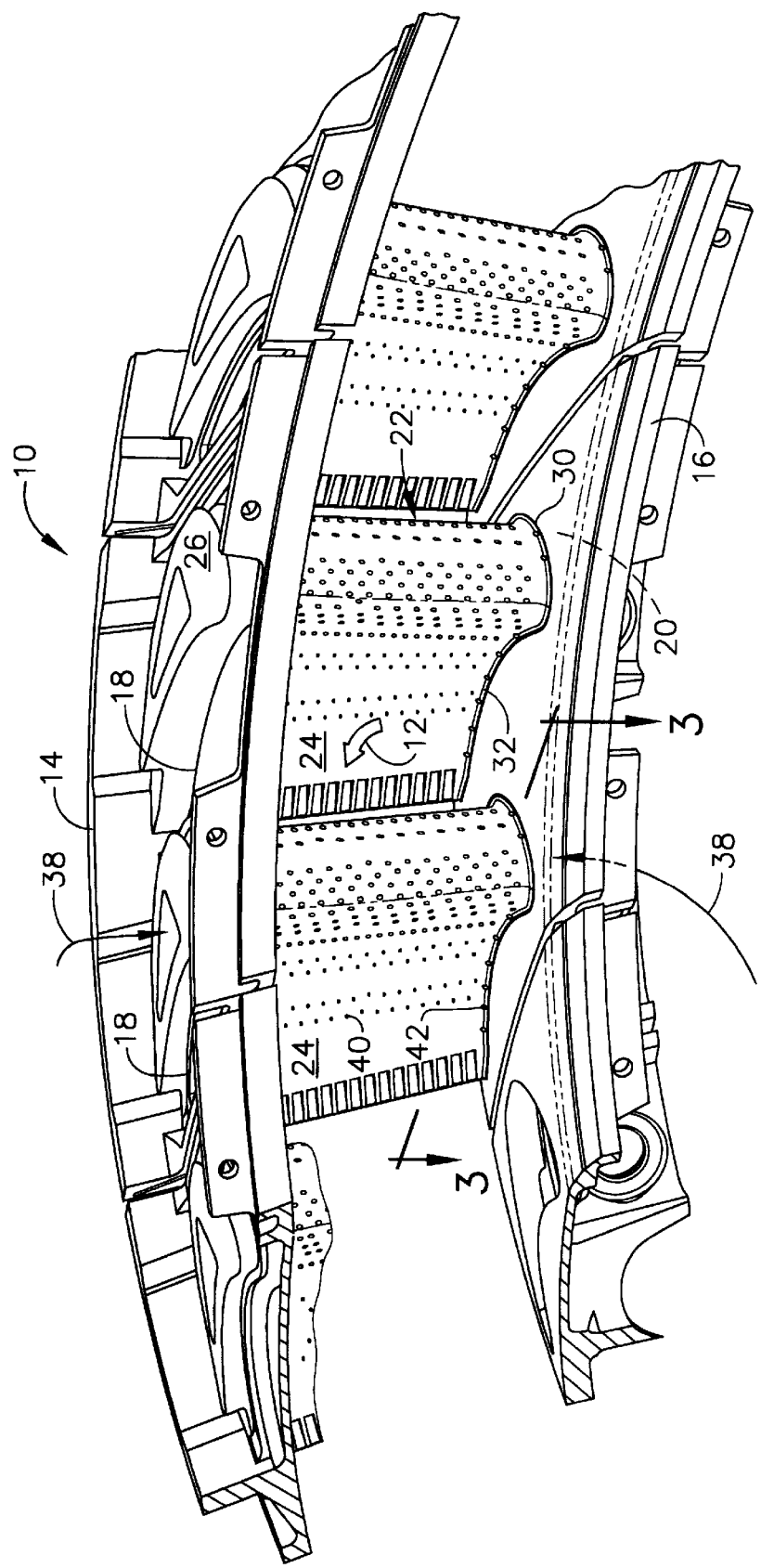
FIG. 1 is an isometric view of a portion of an annular high pressure turbine nozzle of a gas turbine engine in accordance with an exemplary embodiment of the present invention.

Illustrated in FIG. 1 is a portion of an axisymmetric high pressure turbine nozzle 10 configured for being positioned at the outlet of a combustor (not shown) in a gas turbine engine. Hot combustion gases 12 are generated in the combustor and discharged therefrom through the turbine nozzle 10 which channels the gases to a row of first stage high pressure turbine rotor blades (not shown) disposed immediately downstream from the nozzle.

The nozzle includes an arcuate radially outer band 14 preferably formed in arcuate segments which collectively define an annular outer ring. Spaced radially inwardly from the outer band is an arcuate, radially inner band 16, also preferably formed in arcuate segments collectively forming an inner ring.

The outer band includes a plurality of outer seats 18 in the form of radial through holes or slots circumferentially spaced apart from each other. And, the inner band includes a plurality of inner seats 20, better illustrated in FIG. 2, in the form of radial through holes or slots circumferentially spaced apart from each other.

A plurality of hollow nozzle vanes 22 extend radially between the outer and inner bands and are fixedly joined in the corresponding seats thereof to provide a rigid assembly. In the exemplary embodiment illustrated in FIGS. 1 and 2, two vanes 22 extend radially between the corresponding outer and inner band segments in a four-part segment, with a plurality of such segments being circumferentially joined together in a complete ring to form the nozzle assembly.

Figure 2:
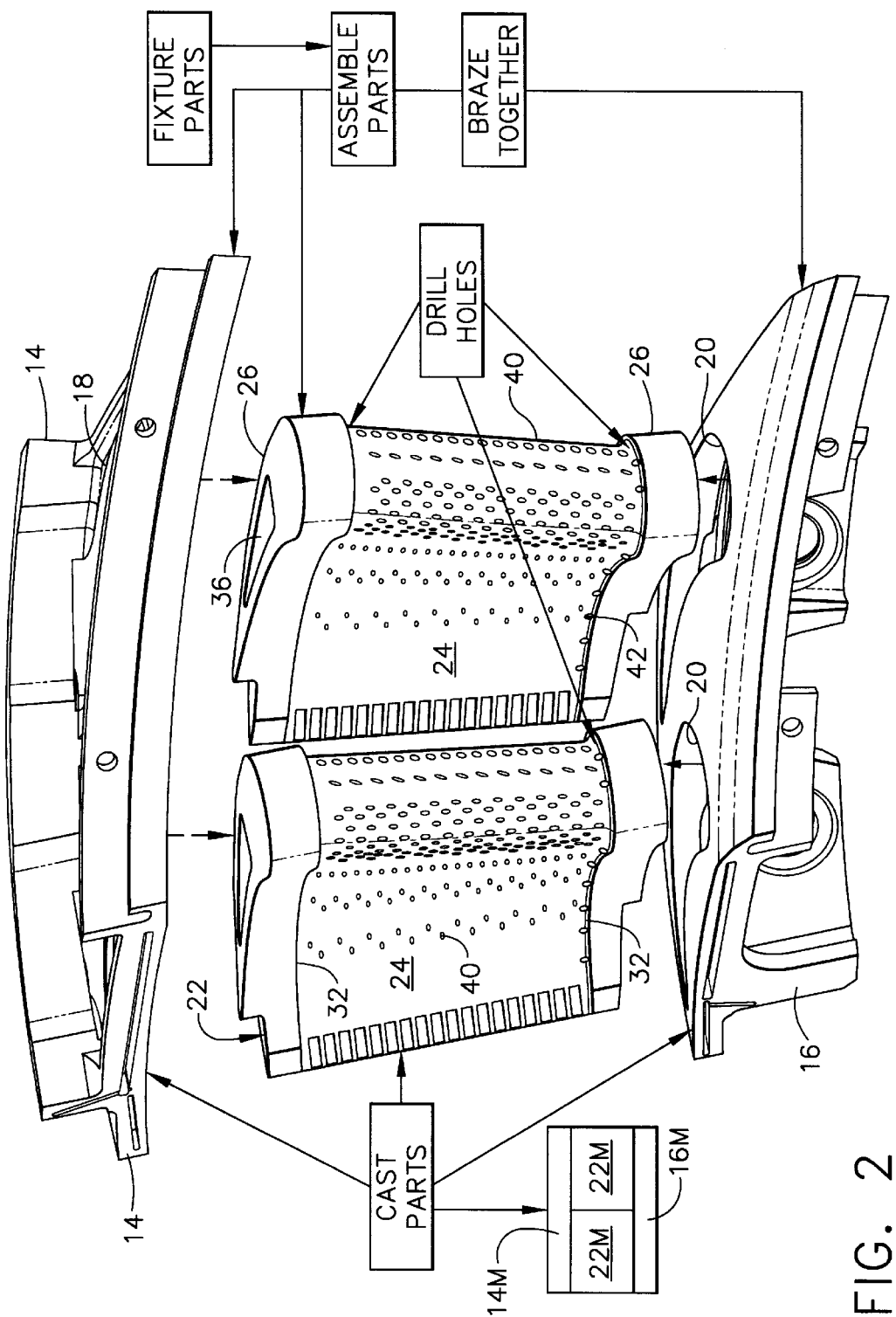
FIG. 2 is an exploded view of a one of the nozzle segments illustrated in FIG. 1, and a corresponding flowchart for a method of manufacture thereof.

As illustrated in FIG. 2, each vane 22 includes a conventional airfoil 24 which extends radially in span between the inboard surfaces of the two bands which confine the combustion gases, and each airfoil includes corresponding outer and inner hubs 26 at the radially opposite ends thereof.

Figure 3:
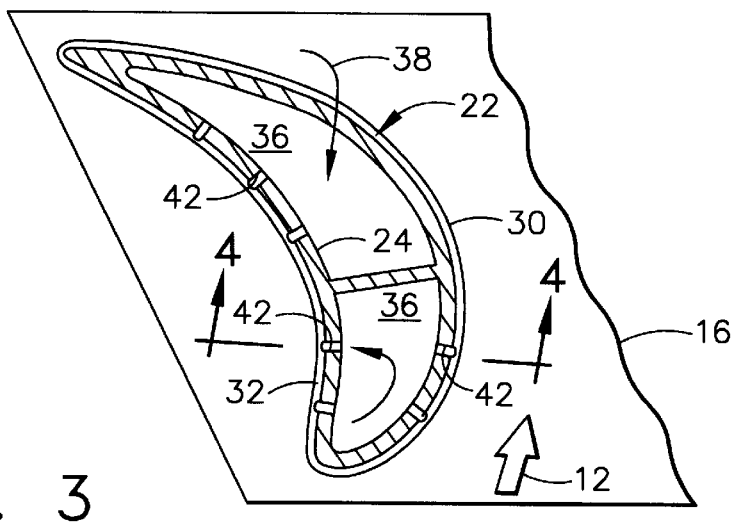
FIG. 3 is a radial sectional view through a portion of the turbine nozzle illustrated in FIG. 1 and taken along line 3—3.

Each airfoil 24 has a conventional configuration including a generally concave pressure side, and an opposite, generally convex suction side extending axially between leading and trailing edges thereof and radially in span between the opposite ends thereof from which extend the corresponding hubs 26. The airfoil has a generally crescent radial profile as illustrated in FIG. 3 for channeling the combustion gases 12 between adjacent vanes to the downstream row of rotor blades during operation.

Figure 4:
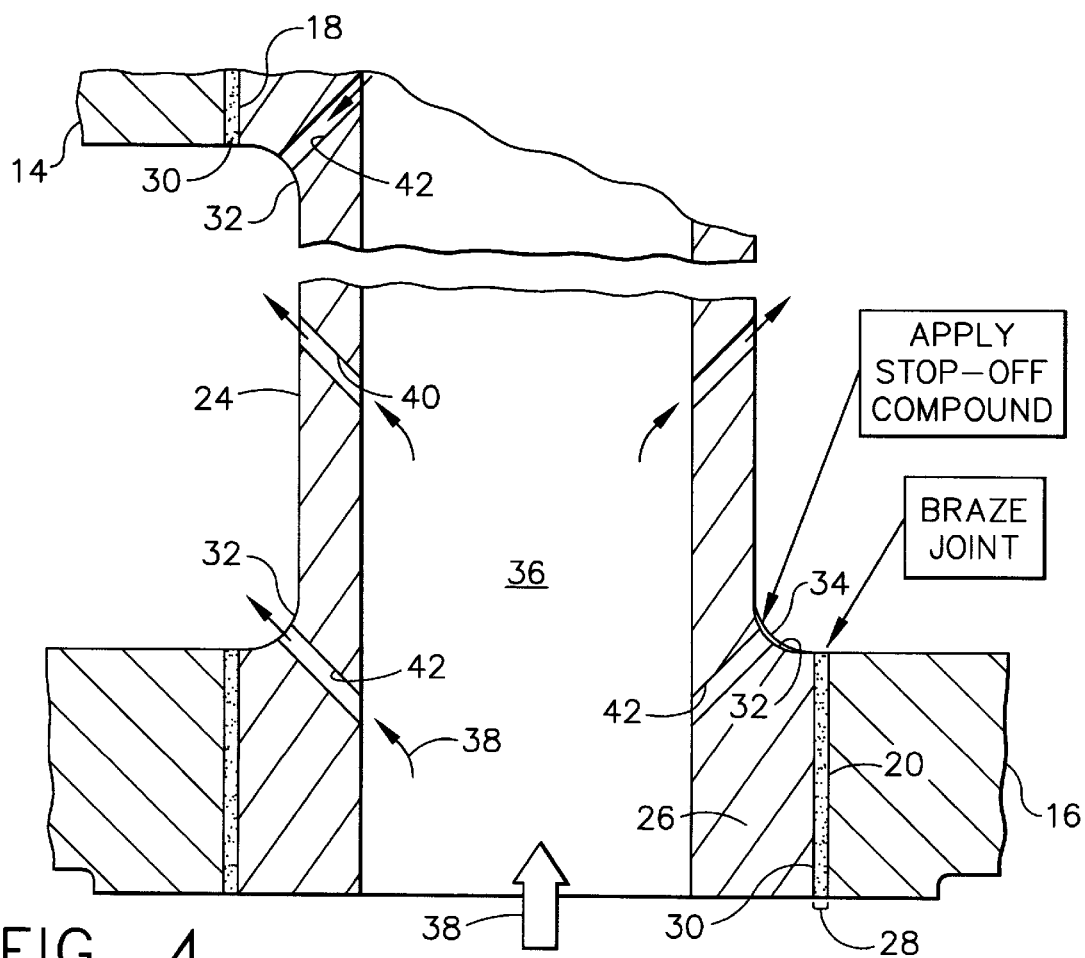
FIG. 4 is an enlarged radial sectional view through a portion of the turbine nozzle illustrated in FIG. 3 and taken along line 4—4.

FIG. 4 illustrates in more detail the junction between an exemplary one of the airfoils 24 and the inner band 16, with the junction with the outer band 14 being substantially identical. The inner hubs 26 are disposed in corresponding ones of the outer and inner seats 18,20 to define corresponding gaps 28 therebetween. Each gap is filled with a braze 30 to fixedly join the vanes to the corresponding bands. The vanes and bands are typically made of conventional high strength superalloy metal for withstanding the high temperature environment of the high pressure turbine nozzle. And, the braze material is a different metal selected to match the chemical composition of the vane and band metal in a conventional manner with conventional chemical compositions.

In accordance with a preferred embodiment of the present invention, the outer and inner hubs 26 of each vane are suitably larger in width than the corresponding airfoil and include corresponding outer and inner fillets 32 which provide a smooth transition between the ends of the airfoils and the surrounding bands. The fillets 32 may have a constant radius as illustrated in FIG. 4, or may have a variable radius as desired for blending the airfoil to the bands.

The enlarged hubs 26 illustrated in FIG. 4, including the corresponding fillets 32, position the hub-to-seat gap 28 sufficiently away from the airfoil to offset the braze 30 therefrom and permit the fillets 32 to be brazeless or devoid of braze adjacent the airfoils.

In this way, the outer edges of the hubs 26 which define the gaps 28 with the inner edges of the corresponding seats 18,20 are laterally spaced or offset generally parallel from the airfoils at the fillets 32, and the braze 30 is confined locally at the gaps 28 and are laterally offset from the airfoil by the extension of the fillets 32 therebetween. The braze joint defined by the braze filled gap 28 is spaced from the airfoil to leave a brazeless fillet 32 which blends the bands to the airfoils.

In the high-cycle turbine nozzle described above in the Background section, the vane-to-band braze joints included braze material extending directly from the root ends of the airfoils laterally outwardly to the adjoining bands to create braze fillets atop the underlying parent metal. These braze fillets are sufficiently thick to hide therein undesirable radial steps between the bands and vanes due to typical variation in manufacturing tolerances between the cast parts.

Casting is imprecise and is subject to random variation in dimensions between the parts. When the cast parts are assembled, radial steps between the vane and bands are found which vary in magnitude around the perimeter of the vane root in its seat in the bands. In the prior design, braze material not only fixedly joins the vanes to the bands, but also filled the junctions therebetween to hide the radial steps in the braze.

Radial steps are undesirable since they provide discontinuity in the flowpath boundaries for the combustion gases, which decrease aerodynamic efficiency, and lead to locally hot temperature thereat. Although the braze material provides a relatively smooth fillet between the vanes and bands in the prior design, the braze material is nevertheless rougher than the parent material of the vanes and bands. Braze roughness increases heat transfer thereat and thereby increases the temperature experienced by the braze. And, the junction between the vanes and bands is subject to relatively high heat transfer during operation as observed from the high-cycle experience, and thusly further increases the local temperature of the braze in the previous design.

Accordingly, by increasing the size of the hub 26 and introducing the fillets 32 in the parent material of the vane itself, the braze joints may be significantly offset from the airfoils 24 to significant advantage. The laterally offset braze joints according to the preferred embodiment of the present invention, position the braze 30 away from the locally high heat transfer region of the hot combustion gases at the roots of vanes defined by the fillets 32. In this way, the relocated braze 30 itself is subject to less heat transfer heating during operation for promoting its durability.

The fillets 32 defined by the parent material may thusly be as smooth as the parent material itself, which is smoother than the braze material for improving aerodynamic efficiency as well as reducing heat transfer coefficients at the fillets and reduce the heating effect thereat.

Since the braze 30 is offset from the airfoil, the exposed surface of the braze material has significantly reduced area and is confined to the area immediately adjacent the gap 28 and does not extend over the fillet 32 to the airfoil. The reduced area of the exposed braze material reduces heating thereof during operation for further reducing the temperature of the nozzle at the junction between the vanes and bands.

In the preferred embodiment illustrated in FIG. 4, the hubs 26 are preferably substantially flush with the bands 14,16 along the corresponding fillets 32, and are fixedly joined together by the braze 30 which itself is substantially flush atop the bands adjoining the fillets 32. The fillets 32 provide a smooth transition from the opposite ends of the airfoils to the inboard surfaces of the corresponding bands 14,16. By forming the inboard edges of the hubs 26 substantially flush with the inboard edges of the corresponding band seats 18,20, radial steps between the fillets and bands are substantially reduced or eliminated. In this way, the fillets and braze blend smoothly with the inboard surfaces of the bands for efficiently confining the combustion gas flow without introducing significant pressure losses therein which would otherwise occur with radial steps at the hub-band joints.

FIG. 2 illustrates in flowchart form a preferred method of forming the turbine nozzle. The individual nozzle parts including the plurality of vanes 22 and outer and inner bands 14,16 are separately cast in a conventional manner. For example, molding dies 14M,16M,22M corresponding with the outer and inner bands 14,16 and vanes 22 are used to conventionally cast these components. The dies are complementary with the external surfaces of the vane and band parts and are filled with wax. The wax is solidified and removed from the dies and coated with ceramic to form a molding shell. The wax is removed from the shell and replaced by molten metal which forms the corresponding parts. Since the vanes are preferably hollow, conventional ceramic cores are used in conjunction with the ceramic shells for casting the vanes in a conventional manner.

The cast vanes and bands are then assembled together by inserting the corresponding hubs 26 of the vanes into the corresponding seats 18,20 in the bands, and temporarily held together in conventional fixtures therefor.

The hubs 26 are then conventionally brazed into their corresponding seats 18,20 locally at the offset gaps 28 without spreading the braze across the fillets 32 to keep them brazeless.

As illustrated in FIG. 4, a conventional stop-off compound or material 34 may be applied over the corresponding fillets 32 to prevent spreading of the braze material over the fillets. The stop-off compound is preferably applied on both sides of the gap 28 along the inboard surfaces of the bands to limit the exposed surface area of the resulting braze to the gap 28 itself and its directly adjacent boundaries.

In conventional casting of turbine nozzle parts, the wax dies are manufactured for the nominal dimensions of the corresponding vane and band parts, and therefore are subject to random variation in dimensions, which are substantial in cast parts as compared with machined parts which may have closer or smaller variation in tolerances. The nominal casting of nozzle parts results in random height steps between the vanes and bands which are conventionally accommodated by filling the junction between the vanes and bands with braze material for forming braze fillets therebetween which hide the radial steps therein.

However, since the metal fillets 32 illustrated in FIG. 4 are brazeless, the braze material is no longer available to hide any radial steps between the hubs and bands. Accordingly, the present invention also includes a preferred method for forming the hubs 26 substantially flush with the corresponding bands 14,16 by initially casting the vane and band parts and assembling these parts together in a conventional manner.

Figure 5:
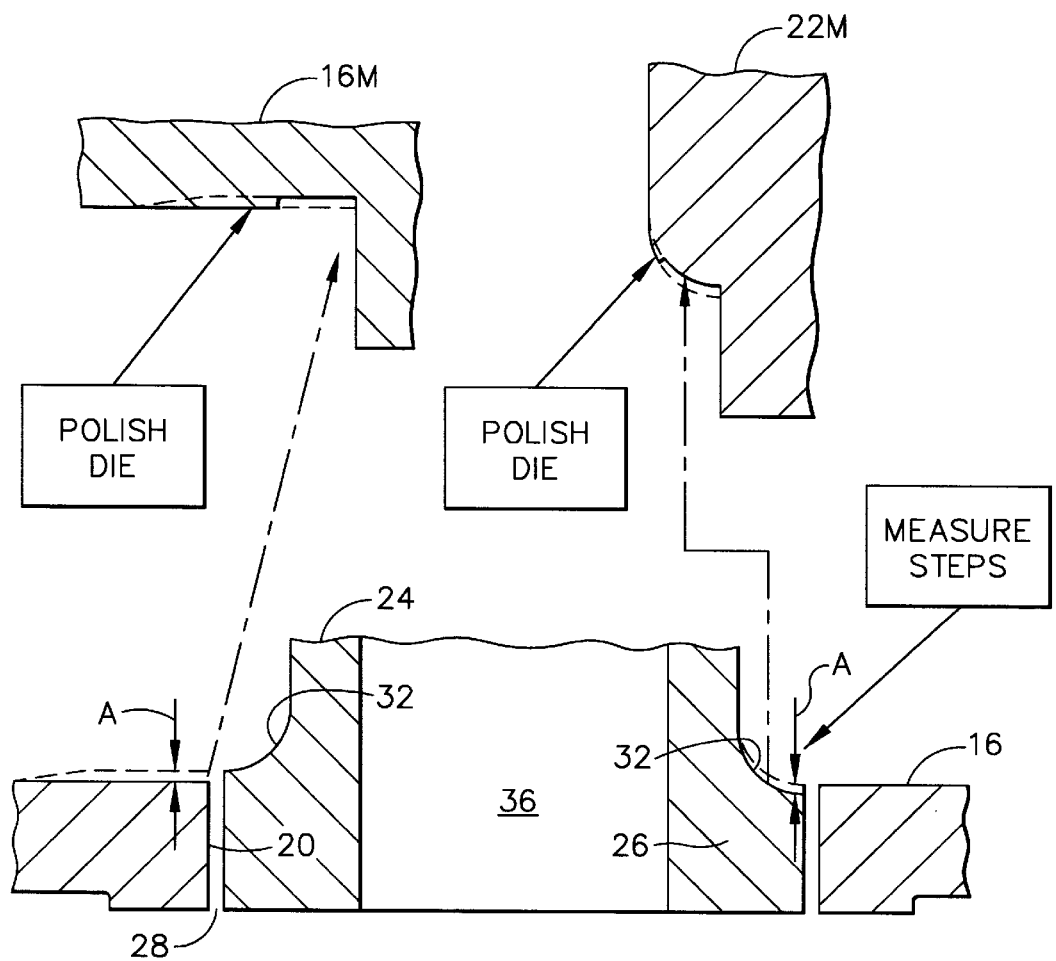
FIG. 5 is a radial sectional view of a portion of the turbine nozzle, like that illustrated in FIG. 4, in conjunction with corresponding portions of casting dies corresponding therewith.

As shown in FIG. 5, the initial assembly of nominally cast vanes and bands will result in randomly sized steps A between the bands 14,16 and the corresponding hubs 26 at the corresponding fillets adjoining the gaps 28. The radial height or size of these steps may then be suitably measured, and then the corresponding vane or band dies 14M,16M, 22M may then be suitably reworked or polished to locally remove Material therefrom corresponding with the measured height of the radial steps.

The reworked or polished dies may then be used again as illustrated in FIG. 2 for casting again new bands and vanes for reducing the measured steps to position the corresponding hubs substantially flush with the bands at the gaps. When the reworked dies are effective for eliminating the radial steps within preferred tolerances, the resulting cast bands and vanes may then be brazed together at the gaps with substantially flush inboard surfaces between the fillets and bands.

As illustrated on the left side of FIG. 5, the left portion of the inner band 16 is thinner than the adjoining hub 26 thereat to provide a corresponding radial step. The band die 16M (shown in relevant part) which corresponds to the inner band 16 is locally polished to remove material therefrom as illustrated in phantom line in FIG. 5 to correspondingly add material or radial height atop the inboard surface of the inner seat 20 in the inner band 16 cast using the die 16M. In this way, by locally removing material from the die 16M, a corresponding increase in material will be added locally in the cast inner band 16 to match the corresponding height of the hub 26 and eliminate the original local step found thereat.

The right side of FIG. 5 illustrates that the local portion of the inner hub 26 is thinner than the adjacent inner band 16 providing a corresponding radial step thereat. In this configuration, the vane die 22M (shown in relevant part) corresponding to the vane itself is locally polished to remove material therefrom as illustrated in phantom line in FIG. 5 to correspondingly add material locally in the hub fillet 32 in the vane for eliminating the original radial step with the band.

In a preferred embodiment, the corresponding wax dies are locally polished for reducing the measured steps, and a new batch of vanes and bands is cast therefrom and again measured for determining the height of any remaining steps. The dies may then be locally polished as required for further reducing the so remeasured steps, and the vanes and bands are again cast and examined. In this way, the dies may be repetitively polished, and the vanes and bands may be repetitively cast with successive dimensional adjustment for reducing the radial steps in stages between the hubs and bands along the corresponding fillets to obtain the desired degree of flush alignment therebetween.

As illustrated in FIGS. 2 and 3, the airfoils 24 are preferably hollow and include one or more internal flow channels 36 extending along the radial span thereof, which extend through one or more of the bands in flow communication with the engine compressor (not shown) for receiving cooling air 38 therefrom. Each vane typically includes several rows of film cooling holes 40 extending through the sidewalls thereof in flow communication with the flow channel 36 for discharging the cooling air therefrom and providing protective films of cooling air over the external surfaces of the airfoils. The airfoil internal flow channel 36 may have any conventional configuration and typically includes turbulators for enhancing internal cooling, and may also include impingement baffles (not shown) disposed therein for providing internal impingement cooling.

By introducing the hub fillets 32 devoid of braze material, the vanes may now also be provided with a plurality of new fillet cooling holes 42 extending through the fillets 32 themselves in flow communication with the flow channel 36 for discharging cooling air therefrom.

As illustrated in FIG. 4, the cooling holes 42 are preferably disposed in the middle of the concave fillets 32, and spaced between the braze 30 and the airfoil 24.

The cooling holes 42 are preferably inclined through the vane toward the braze 30 for film cooling thereof in addition to providing internal convection cooling through the holes themselves. The fillets holes 42 in the inner hub 26 are inclined radially outwardly for discharging the cooling air outwardly through the corresponding fillets 32 along the inner surface of the inner band. Correspondingly, the cooling holes 42 through the outer hub are inclined radially inwardly to discharge the cooling air through the corresponding fillets along the inner surface of the outer band.

The lateral offset of the outer edges of the hub 26 from the outer surface of the airfoil 24 is sufficiently large for introducing the cooling holes 42 through the corresponding fillets 32. For example, the nominal wall thickness of the airfoil 24 illustrated in FIG. 4 may be about 1.3 mm, with the lateral thickness of the hub 26 being about 2.6 mm, with the difference therebetween representing the lateral offset of the hub perimeter or lateral extent of the fillets 32 of about 1.3 mm. The fillet cooling holes 42 may have a nominal diameter of about 0.5 mm and have outlets at the fillets suitably spaced away from the braze joint. The relatively large radius fillets 32 thusly provide sufficient area in which to form the fillet cooling hoes 42 not previously possible. And, since the braze joint is offset from the fillet 32, plugging of the fillet holes with braze material may be prevented during manufacture.

More specifically, and initially referring to FIG. 2, the vanes 22 and bands 14,16 are initially separately cast prior to assembly. All of the film cooling holes 40 as well as the fillet cooling holes 42 may then be conventionally drilled through the vane, with the fillet holes being drilled through the corresponding fillets 32.

The vanes and bands may then be assembled together and brazed at the corresponding gaps to expose the cooling holes 42 in the fillets 32 as illustrated in FIG. 4 without plugging fillet holes with the braze material.

As shown in FIG. 4, prior to brazing the stop-off material 34 is applied to the fillet 32 around the fillet cooling holes 42 to prevent plugging of the fillet holes with braze as well as preventing the braze material from spreading across the fillet 32 to the adjoining airfoil.

In the previous design disclosed above in the Background section, any attempt to predrill holes at the vane roots prior to brazing would be unproductive since it not possible to prevent plugging thereof during the brazing operation. Any attempt to apply the stop-off compound locally around any such root cooling holes would compromise the integrity of the resulting braze as well as introduce discontinuities in the braze material which would adversely affect aerodynamic performance. And, root cooling holes formed after the brazing process are not possible since the corresponding roots of the nozzle vanes are not accessible for drilling at all required locations.

However, in view of the relatively large hub fillets 32 illustrated in FIG. 4, the fillet holes 42 may be drilled prior to assembly of the nozzle parts, and protected as required by the stop-off compound for permitting subsequent brazing of the gap 28. The fillet holes 42 thusly introduce internal convection cooling therethrough as well as film cooling at the hub fillets 32 which provides cooling in this region not otherwise possible.

As indicated above, the braze joint is offset from the airfoil root around the outer perimeter of the fillets 32 which reduces heat input thereto, and the fillet holes 42 introduce cooling at the vane roots not otherwise possible. The braze is thusly further protected from degradation from the hot combustion gases for additionally increasing durability of the already durable turbine nozzle. Further useful life in the turbine nozzle may therefore be obtained to more fully utilize the available life of the parent metal material itself.

The durability and life of the turbine nozzle is significantly increased by reducing braze joint temperature and oxidation therefrom. The braze joint is laterally offset from the vane root in the region of high heat input, which now is provided with fillet cooling not previously possible. The improved cooling additionally protects both the braze joint itself as well as the parent material in the corresponding fillets for reducing oxidation of both the braze and parent materials.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   an outer band having a plurality of outer seats therein;
   an inner band having a plurality of inner seats therein;
   a plurality of nozzle vanes each including an airfoil having outer and inner hubs at opposite ends thereof blending therewith at corresponding outer and inner fillets; and
   said vane hubs being disposed in corresponding ones of said outer and inner seats to define gaps therebetween having braze therein to fixedly join said vanes to said bands, and said fillets being brazeless adjacent said airfoils.

2. A nozzle according to claim 1 wherein said gaps are offset generally parallel from said airfoils at said fillets, and said braze is offset from said airfoil by said fillets therebetween.

3. A nozzle according to claim 2 wherein said hubs are substantially flush with said bands at said gaps, and said braze is substantially flush atop said gaps between said fillets and bands.

4. A method of forming said turbine nozzle according to claim 3 comprising:
   casting said bands and vanes in corresponding dies;
   assembling said cast bands and vanes;
   measuring size of any steps between said bands and hubs at said fillets;
   polishing said dies to locally remove material therefrom corresponding with said measured steps;
   casting again said bands and vanes in said polished dies for reducing said measured steps to position said hubs substantially flush with said bands at said gap; and
   brazing said bands and vanes together at said gaps.

5. A method according to claim 4 wherein said die corresponding to one of said bands is polished to remove material therefrom to correspondingly add material atop said seat in said band cast therefrom.

6. A method according to claim 4 wherein said die corresponding to one of said vanes is polished to remove material therefrom to correspondingly add material atop said fillet in said vane cast therefrom.

7. A nozzle according to claim 3 wherein each of said vanes further comprises:
   an internal flow channel extending through said airfoil for channeling cooling air therethrough; and
   a cooling hole extending through one of said fillets in flow communication with said flow channel.

8. A nozzle according to claim 7 wherein said cooling hole is spaced between said braze and said airfoil.

9. A nozzle according to claim 8 wherein said cooling hole is inclined through said vane toward said braze for film cooling thereof.

10. A method of forming said turbine nozzle according to claim 7 comprising:
    separately casting said vanes and bands;
    drilling said cooling hole through said one fillet of said cast vane;
    assembling said vanes and bands; and
    brazing said vanes and bands together at said gaps to expose said cooling hole at said fillet.

11. A method according to claim 10 further comprising applying a stop-off material to said fillet around said cooling hole prior to brazing to prevent plugging said cooling hole with said braze.

12. A turbine nozzle comprising a plurality of airfoils and integral hubs brazed into corresponding seats of outer and inner bands, with said hubs having brazeless fillets blending said bands to said airfoils.

13. A nozzle according to claim 12 wherein said hubs are substantially flush with said bands along said fillets, and are fixedly joined together by braze being substantially flush atop said bands adjoining said fillets.

14. A nozzle according to claim 13 wherein said airfoils are hollow, and a plurality of cooling holes extend through said fillets for discharging cooling air from inside said airfoils.

15. A nozzle according to claim 14 wherein said cooling holes are spaced between said braze and said airfoils.

16. A nozzle according to claim 15 wherein said cooling holes are inclined through said airfoils toward said braze for film cooling thereof.

17. A method of forming a turbine nozzle comprising:

separately casting a plurality of vanes and outer and inner bands;

assembling said vanes and bands by inserting hubs of said vanes into corresponding seats in said bands; and brazing said hubs into said seats without spreading braze across fillets of said hubs adjoining airfoils of said vanes.

18. A method according to claim 17 wherein said vanes and bands are cast for aligning said hubs substantially flush with said bands along said fillets.

19. At method according to claim 18 wherein said vanes and bands are repetitively cast with dimensional adjustment for reducing steps between said hubs and bands along said fillets to obtain said flush alignment.

20. A method according to claim 19 further comprising drilling a plurality of cooling holes through said fillets prior to brazing, and brazing together said vanes and bands without plugging said holes with said braze.

* * * * *